United States Patent [19]
Osenkowski et al.

[11] Patent Number: 5,383,707
[45] Date of Patent: Jan. 24, 1995

[54] INTERLOCK FOR FOLD DOWN SEAT BACK AND INTEGRAL CHILD SEAT

[75] Inventors: Joseph M. Osenkowski, Detroit; James L. Weber, W. Bloomfield; Wojciech Wdziekonski, Detroit; Kurt A. Bart, E. Clinton Twp., Macomb County, all of Mich.

[73] Assignee: Hoover Universal, Inc., Plymouth, Mich.

[21] Appl. No.: 174,376

[22] Filed: Dec. 28, 1993

[51] Int. Cl.⁶ .................................. A47C 15/00
[52] U.S. Cl. .................... 297/238; 297/378.12
[58] Field of Search .............. 297/238, 378.12, 113, 297/378.1

[56] References Cited

U.S. PATENT DOCUMENTS

| | | | |
|---|---|---|---|
| 2,833,336 | 5/1958 | McGregor | 297/378.12 |
| 3,517,965 | 6/1970 | Cowles et al. | 297/378.12 |
| 5,161,855 | 11/1992 | Harmon | 297/238 |
| 5,280,995 | 1/1994 | Elton | 297/238 |

Primary Examiner—Kenneth J. Dorner
Assistant Examiner—David E. Allred
Attorney, Agent, or Firm—Harness, Dickey & Pierce

[57] ABSTRACT

An interlock for a fold down seat back with an integral child seat prevents the use of the child seat unless the fold down seat back is latched in place and likewise prevents unlatching of the seat back when the child seat is deployed. The interlock is provided as a simple subassembly that can be added to the seat back quickly and easily. The interlock avoids the need for a striker bar attached to the child seat cushion panel and minimizes the extent of modifications required to an existing seat back latch.

16 Claims, 5 Drawing Sheets

INTERLOCK FOR FOLD DOWN SEAT BACK AND INTEGRAL CHILD SEAT

BACKGROUND AND SUMMARY OF THE INVENTION

The present invention relates to a vehicle seat assembly having a child seat integrated into a seat back which is in turn rotatably mounted in the vehicle and in particular to an interlock between the integral child seat assembly and a latch for the rotating seat back.

Many vehicle seat assemblies, such as bench seats in a van or multi-purpose passenger vehicle and the rear seats in certain passenger cars, are equipped with seat backs that are rotatable between an upright use position and horizontal storage position. The rotating rear seat back is provided in passenger cars to expand the trunk capacity of the vehicle into the rear seat area. In vans, a folding seat back enables larger items to be carried in the van on top of the seats and reduces the storage space required for a removable seat when the seat has been removed from the vehicle. The rotating seat back includes a latch mechanism to hold the seat back in its upright use position. In a van bench seat, the latch is typically at one or both sides of the seat assembly near the seat back pivot axis. In a passenger car seat assembly with a fold down rear seat back, the latch is typically at the top of the seat back and secures the seat back to the rear sill or package shelf of the passenger car body.

Many seat assemblies have been developed which include an integral child seat that enables an infant or small child to be safely carried in the vehicle without the need for a separate child seat. Integral child seats typically include a child seat cushion panel rotatably mounted to the seat back of a seat assembly. In a stowed position, the child seat cushion panel forms a portion of the adult seat back. When the child seat is deployed, the child seat cushion panel forms a horizontal seat cushion for a child occupant. Additional components of the child seat may also be included in the seat back.

The integral child seat also includes a separate restraint system for the child. The separate child restraint system is generally a three or five point belt restraint. In many cases, at least a portion of the loads from all or some of the restraint system belts are transferred to the seat back frame and from there to the vehicle body structure. When a child seat is integrated into a folding seat back, the child seat restraint loads are transferred from the seat back frame to the vehicle body through the seat back latch. It is thus necessary to ensure that the child seat is not used unless the seat back is properly latched in its upright use position.

Interlock mechanisms have been developed which couple the seat back latch to the child seat. The interlock mechanism prevents deployment of the child seat when the seat back is unlatched and prevents unlatching of the seat back when the child seat is deployed. One type of interlock mechanism includes a latch for holding the child seat cushion panel in a stowed position. The child seat latch includes a latch striker bar mounted to the child seat cushion panel. Other types of interlock mechanisms have been developed which use a number of cams and levers at each end of a pull cable to connect the seat back latch to the child seat cushion panel. One such interlock pulls on the cable upon deployment of the child seat and adds a cam to the seat back latch to prevent release of the seat back when the child seat is deployed. This requires extensive modification of the seat back latch.

It is an object of the present invention to provide an interlock mechanism which avoids the need for a latch striker on the child seat cushion panel and which minimizes the number of separate components i.e., cams and levers, in the interlock mechanism.

In addition, since seat back latches have been previously developed without an interlock mechanism, it is a further object of the invention to minimize the redesign of the seat back latch in providing the interlock mechanism.

It is another object of the invention to provide an interlock mechanism in the form of a subassembly which can be easily installed during assembly of the seat back. This reduces the number of separate components that need to be added to the seat back frame when the child seat option is desired.

The seat assembly of the present invention, with a folding seat back and an integral child seat within the seat back, includes an interlock between the seat back latch and the integral child seat which operates at the pivot point of the child seat cushion panel. By locking the child seat cushion at the pivot point, the need for a striker positioned on the child seat cushion panel is eliminated. The interlock includes a cable connected at one end to a moving component of the seat back latch and connected at the other end to a pivoting lock member adjacent to the child seat cushion panel pivot. The lock member either directly engages the moving hinge of the child seat cushion panel or engages a pawl which in turn engages the hinge. In an alternative embodiment, a pawl engages a sector fixed to the child seat cushion panel pivot shaft to prevent the shaft from rotating.

By attaching the pull cable to an existing moving component of the seat back latch, for pulling of the cable upon latch release, minimal redesign of the seat back latch is required. The cable is pulled by operation of the seat back latch to move the lock member at the child seat cushion panel pivot. This configuration reduces the number of components in the interlock mechanism to a minimum compared to prior interlock mechanisms. The result is a low cost interlock mechanism which, due to the small number of components, is simple and easy to assemble.

At the child seat cushion panel pivot, the interlock mechanism is contained within a housing as a subassembly that is mounted to the seat back frame. In one embodiment, the housing actually forms the pivot attachment for the child seat cushion panel at one side. With a similar hinge only housing on the other side, the only frame modifications needed for the child seat option are the addition of two housings. In another embodiments the child seat cushion panel pivot shaft extends into the housing and is coupled to the interlock mechanism.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
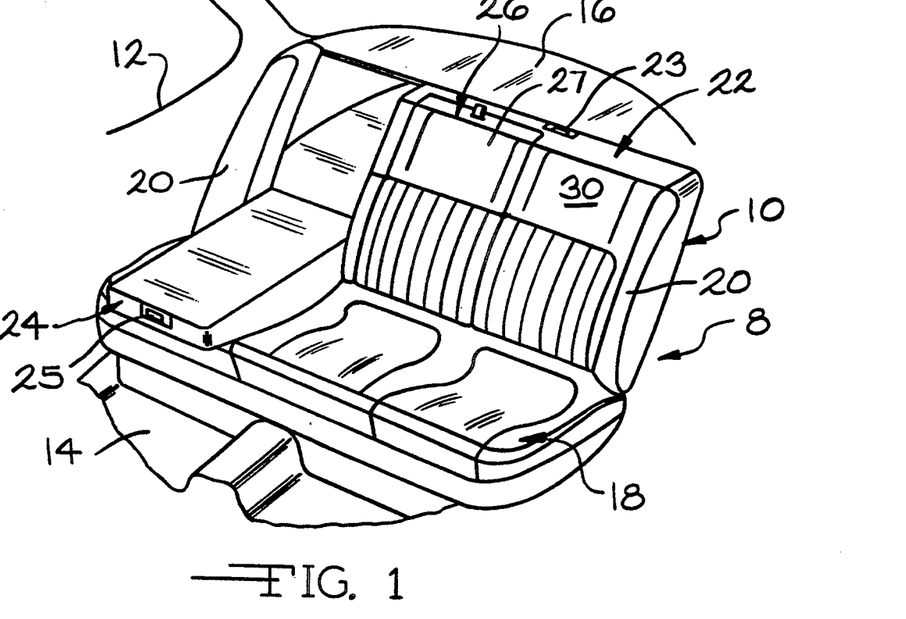
FIG. 1 is a perspective view of the seat assembly of the present invention shown installed in a motor vehicle having two fold down seat back panels with a child seat integrated into one of the seat back panels.

The seat assembly of the present invention, having a rotating seat back panel with an integral child seat, is shown in FIG. 1 and designated generally at 8. Seat assembly 8 is installed within a motor vehicle body 12 having a floor pan 14 and a rear sill or package shelf 16. The seat assembly 8 includes a lower seat cushion 18 and a seat back 10. Seat back 10 extends generally upwardly at the rear of the seat cushion.

As shown and described, the seat assembly 8 is a rear bench seat in a passenger car having a rear shelf structure. However, as will become apparent, the invention is not limited to seat assemblies for passenger cars with a rear shelf.

The seat back 10 includes a pair of side bolsters 20 at the lateral sides of the seat back and a pair of seat back panels 22 and 24. The panels 22 and 24 are mounted to the vehicle body for rotation about a lateral axis at the lower ends of the panels. The seat back panels rotate between an upright use position shown in FIG. 1 and a forwardly extending stowed position, resting upon the seat cushion 18. In FIG. 1, panel 22 is shown in its upright use position and panel 24 is shown in its forwardly extending stowed position. When one or both of the panels 22 and 24 are in their forwardly extending stowed positions, access is permitted to the trunk space behind the seat back panels, thus increasing the trunk storage volume.

The seat back panel 22 has a lateral width of approximately sixty percent that of a seat back while the panel. 24 has a width of the remaining forty percent. Depending upon the amount of increased cargo space required, one or both of the seat back panels can be folded down. Seat back panel latches 23 and 25 are provided for latching the panels 22 and 24 in their upright use positions.

The seat back panel 22 has a child seat 26 incorporated therein for use by a child occupant. The child seat is thus referred to as an integral child seat. The child seat includes a seat cushion panel 27 mounted at its lower end to the seat back panel 22 for rotation about transverse axis 29. The seat cushion panel 27 has an upright stowed position within the seat back panel 22 and forms a portion of the surface 30 of the seat back panel 22. The child seat cushion panel is rotatable to a forwardly extending use position shown in FIG. 2 for use as a child seat cushion. When in its use position, the child seat cushion panel 27 is generally horizontal and forms a seating surface 32 upon which a child can be seated. The child seat cushion panel 27 is formed by a seat pan 28 shown in FIGS. 4 and 5 with an upholstered foam pad 29 on the front side for use as an adult seat back and an upholstery cover and removable pad 34 on the rear side to form the child seating surface 32.

Figure 2:
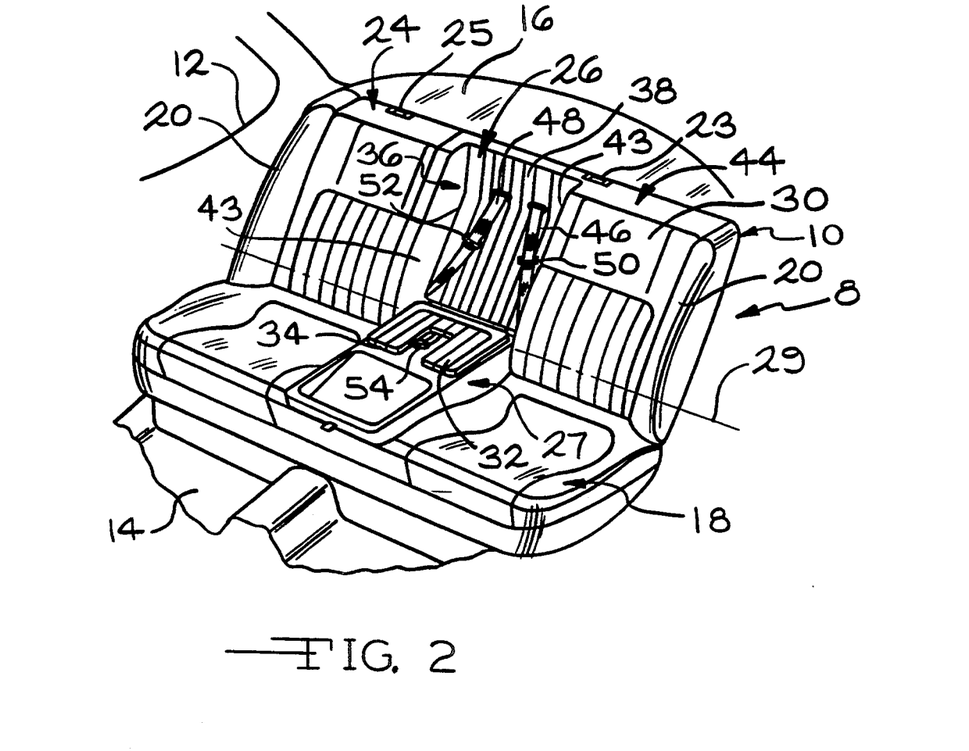
FIG. 2 is a perspective view of the seat assembly similar to FIG. 1 showing the child seat in a deployed position.

When the child seat cushion panel 27 is rotated to its horizontal use position, a recess 26 is revealed in the seat back panel 22. The recess has a seat back surface 38 against which a child seat occupant leans. The adult seat back cushion 44 of the panel 22, forms side bolsters 43 for the child seat assembly on each side of the recess 26.

When the child seat cushion panel 27 is rotated to its use position, a restraint system for the child seat assembly is revealed. The restraint system includes a left shoulder belt 46 and a right shoulder belt 48. Sliding clasps 50 and 52 are provided on the belts 46 and 48 respectively. A buckle 54 is provided on the top of the seat cushion 27 for reception of the two clasps 50 and 52. The belt system shown is representative of any of a variety of belt arrangements that can be used for the child seat assembly restraint system. A portion of the load from the restraint system is transferred from the belts to the frame of the seat back panel 22 and from the frame, through the latch 23, to the vehicle body 12. Since the seat belt load from the child seat restraint system is carried through the latch 23, it is necessary that the child seat be used only when the seat back panel 22 is in its upright use position and is coupled to the vehicle shelf 16 through the latch 23.

Figures 3, 4:
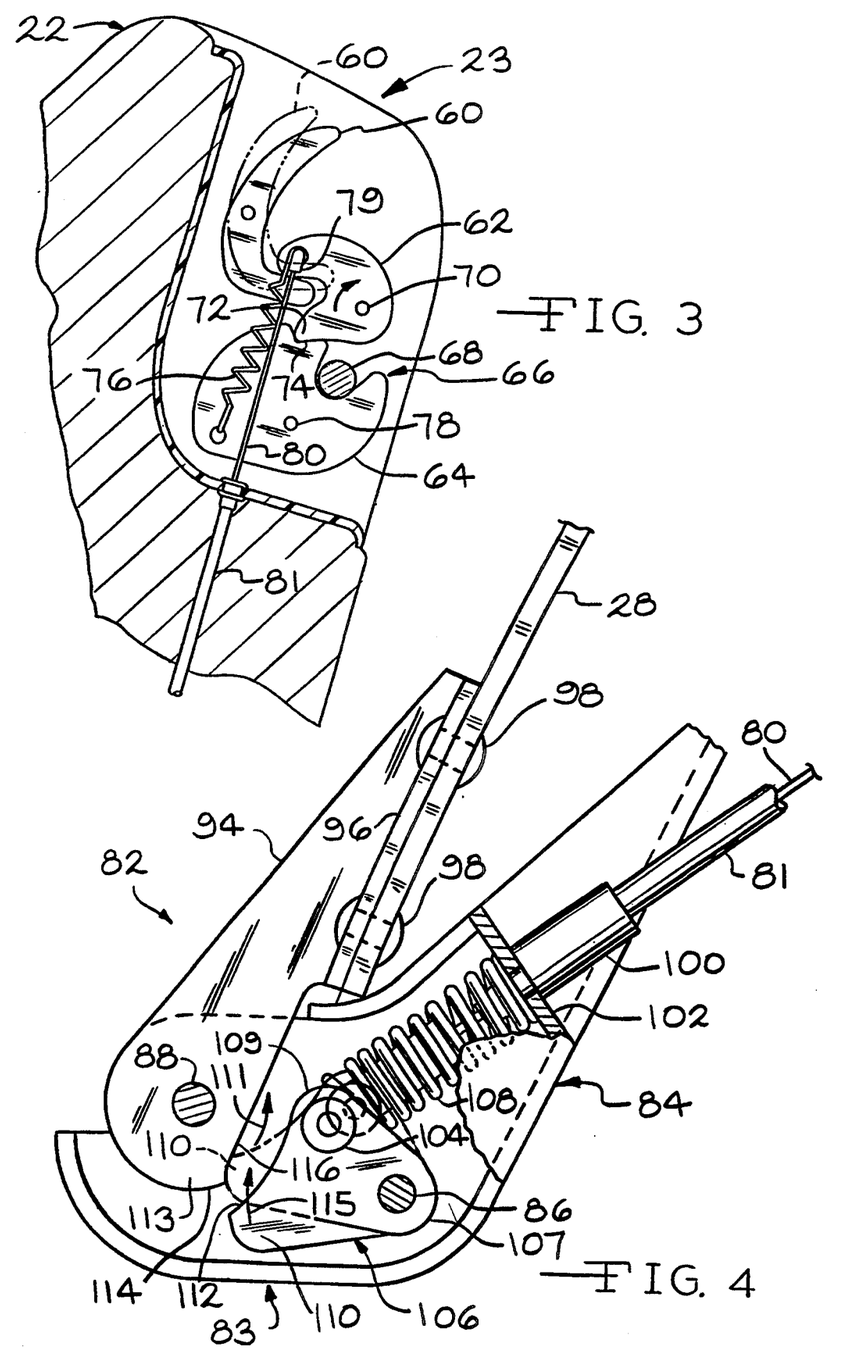
FIG. 3 is a side elevational view of the fold down seat back panel latch;.
FIG. 4 is a side elevational view of the interlock mechanism at the child seat cushion panel pivot with the child seat panel in the stowed position.

The latch 23 is shown in greater detail in FIG. 3. The latch 23 includes a handle 60 shown in a latch position in the solid line and in a release position in the broken line. The handle 60 engages a cam 62 which has a leg 72 engaging the latch plate 64 in a notch 74. Latch plate 64 also includes a notch 66 for reception of a striker bar 68 attached to the rear sill 16 of the vehicle body. When the handle 60 is moved to the release position, the cam 62 is rotated clockwise about its pivot 70, removing the leg 72 of the cam from the notch 74 in the latch plate. This enables the latch plate 64 to rotate. Spring 76 connecting the cam to the latch plate causes the latch plate to rotate clockwise about its pivot 78 in response to rotation of the cam. This rotation of the latch plate frees the striker 68 from the latch plate notch 66, freeing the seat back panel 22 for rotation away from the package shelf 16.

One end 79 of a pull cable 80 is connected to the cam 62 so that as the cam is rotated clockwise as viewed in FIG. 3, tension is applied to the cable. The cable 80, as further described below, is used to connect the latch 23 with the child seat to prevent deployment of the child seat cushion panel when the latch 23 is released and to also prevent release of the latch 23 when the child seat assembly is deployed. Latch 23 is typical of any of a variety of latches which can be used to secure the back panel 22 to the package shelf 16. Various latch mechanisms can be used in this application. The only requirement for use of the latch with the interlock mechanism is that the latch includes a moving member, that upon release of the latch, can induce tension in the cable 80. Other than the connection of the cable to the cam 62, the latch is not modified from previously developed seat back latches. Thus, current production latches can be used with very minimal changes. Other devices besides the cable 80 can be used to connect the latch 23 with the child seat such as a push/pull rod.

One hinge of the child seat cushion panel 27 is shown in FIG. 4 and designated generally at 82. Hinge 82 includes a two-piece housing 84 joined together by rivets 86 and 88. Housing 84 has an extending flange 90 for mounting the housing to the frame 92 of the seat back panel 22 by fasteners (not shown) extending through the apertures 94 in the flange 90. The housing 84 forms a stationary or fixed member of the hinge 82. The rivet 88 functions as a pivot pin for the hinge to mount a rotating hinge member 94 to the housing 84. The rotating hinge member 94 has an extending flange 96 to mount the pan 28 of the child seat cushion panel 27 by rivets 98 or similar fasteners.

The sheath 81 of the cable 80 is coupled to a tab 102 of the housing 84 by a connector 100. The end 104 of the cable is attached to a lock member or cam 106 which is pivotally mounted to the housing 84 by the rivet 86. A coil compression spring 108 surrounding the cable between the lock member 106 and connector 100 serves to bias the lock member in the counterclockwise direction shown in the solid line.

The lock member is somewhat triangular in shape. The rivet 86 is generally at one corner 107 and the cable end 104 is at another corner 109. The third corner 110 is spaced from the rivet 86 and cable end 104 and forms an engagement portion of the lock member. The edge 112 of the lock member between the corners 109 and 110 is generally circular and concave.

The rotating hinge member 94 has an engagement portion 113 having a first edge section 114 which is generally circumferential about the pivot axis 29 formed by rivet 88. A part of the circular edge section 114 is cut away leaving an second edge section 116 which is recessed inward toward the pivot axis. When the child seat cushion panel 27 is in its upright stowed position, the concave edge 116 of the hinge member 94 is facing the concave circular edge of the lock member 106. The center of curvature of the concave edge 112 of the lock member 106 is generally near the pivot center of the hinge member 94. The edge 112 of the lock member is spaced from hinge member 94. The hinge member is free to rotate to deploy the child seat cushion panel as shown in FIG. 5, moving the circular edge section 114 of hinge member 94 along a path of travel 111 into confrontation with the concave edge 112 of the lock member 106.

With reference again to FIG. 4, when the cable 80 is pulled upon release of the latch 23, the lock member 106 is rotated clockwise to the broken line position shown in FIG. 4. The corner 110 is moved along a path of travel 115 into engagement with or closely spaced from the edge section 116 of the hinge member 94. The corner 110 is now in the path along which the hinge member 94 travels when the child seat cushion panel 27 is rotated from its stowed position. Thus, with the latch 23 released and the lock member 106 rotated by the cable 80, the lock member interferes with the hinge member and the child seat is prevented from being deployed. When the seat back panel 22 is again latched, the tension in cable 80 is relieved and the compression spring 108 is able to force the lock member 106 back to its solid line release position in FIG. 4. In this position, the lock member 106 is out of the path of travel of the child seat cushion hinge member 94 and the child seat can be deployed.

Figure 5:
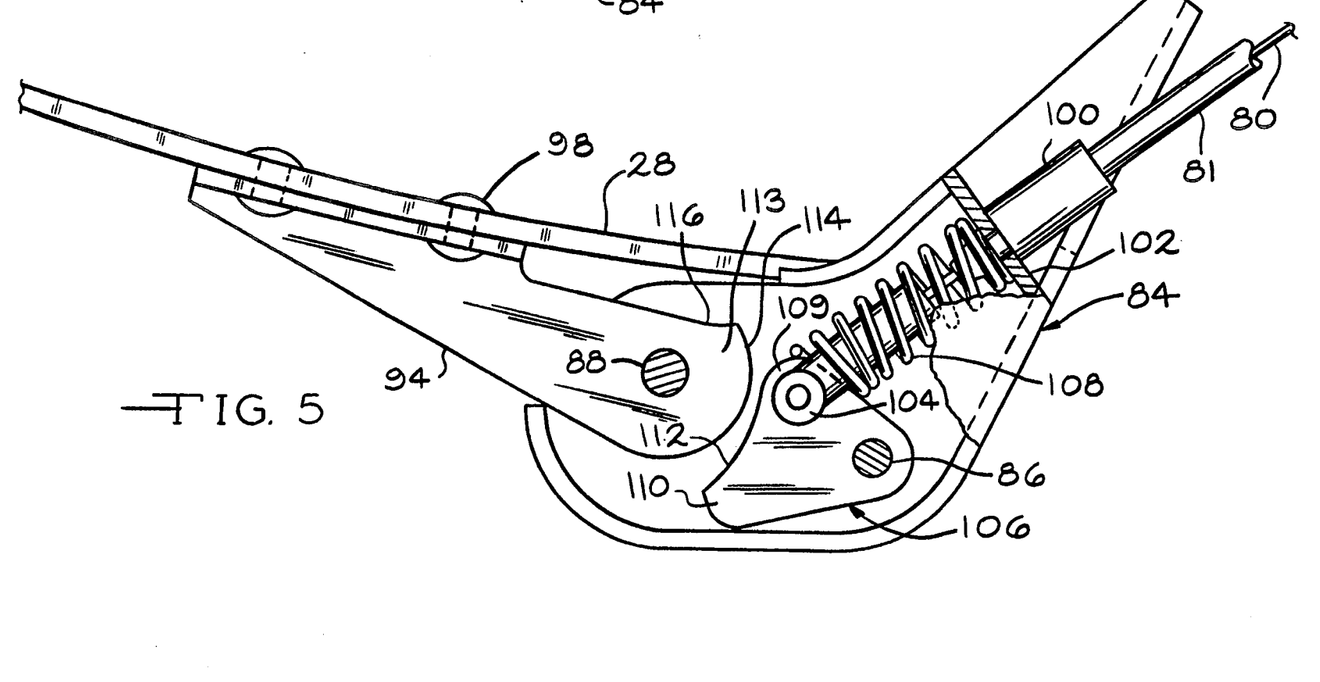
FIG. 5 is a side elevational view similar to FIG. 4 showing the child seat cushion panel in a deployed position.

In FIG. 5, the rotating hinge member 94 is shown in the deployed position for the child seat cushion panel 27. In this position, the circular edge 114 of the hinge member confronts the concave edge portion 112 of lock member 106. The edge 114 of the hinge member 94 is now within the path of travel of the lock member 106 such that the corner 110 of the lock member will engage the edge 114 of the hinge member prior to the release of the latch 23. As a result, the latch can not be released when the child seat is in the deployed position and the child seat assembly can not be used without the seat back panel being latched in position and providing a path for the child seat restraint loads from the seat back frame to the vehicle body.

Figure 6:
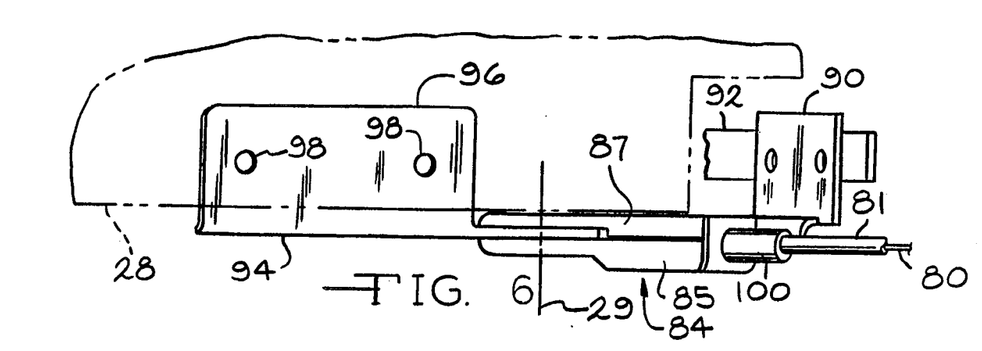
FIG. 6 is a top view of the child seat interlock mechanism housing.

FIG. 6 is a top view of the housing 84 showing its halves, 85 and 87. The housing includes the extending flange 90 for mounting the housing to the seat back frame 92. The interlock mechanism is provided as a subassembly within housing 84. A second hinge member, not shown, like hinge member 94, is rotatably mounted to the seat back frame on the opposite side of the child seat cushion panel. The pan 28 of the child seat cushion panel 27 is attached to the two hinge members.

Figure 7:
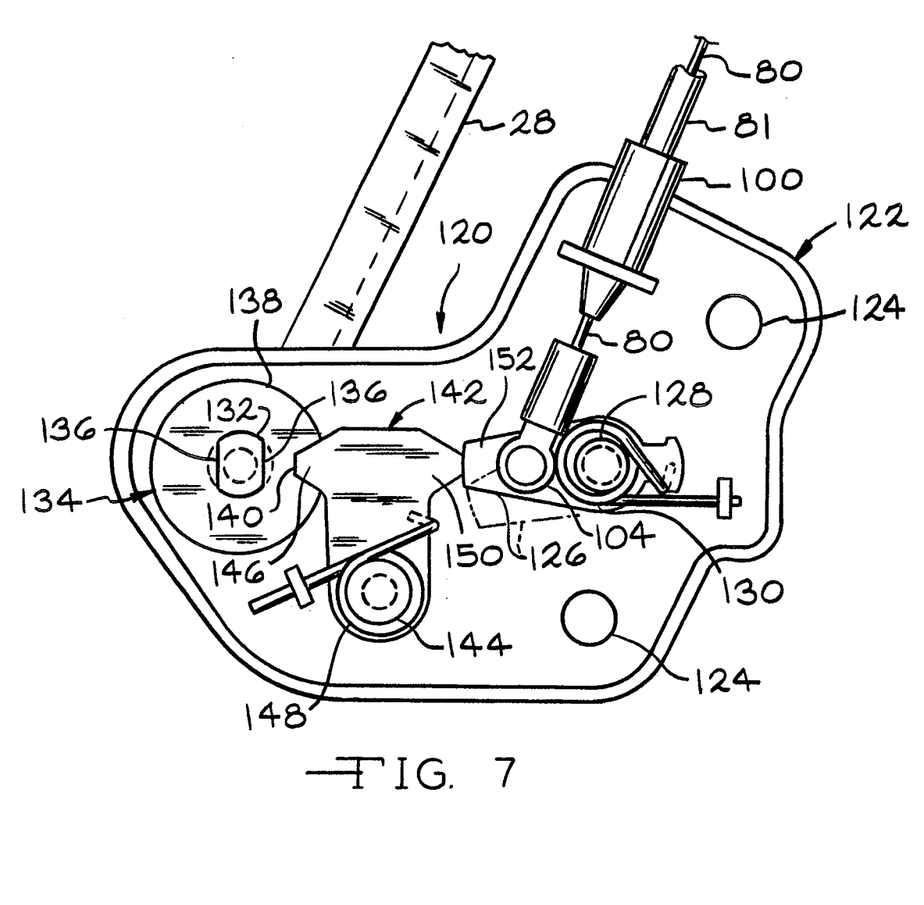
FIG. 7 is a side elevational view of an alternative embodiment of the interlock mechanism at the child seat cushion panel pivot showing the child seat cushion panel in a stowed position.
Figure 8:
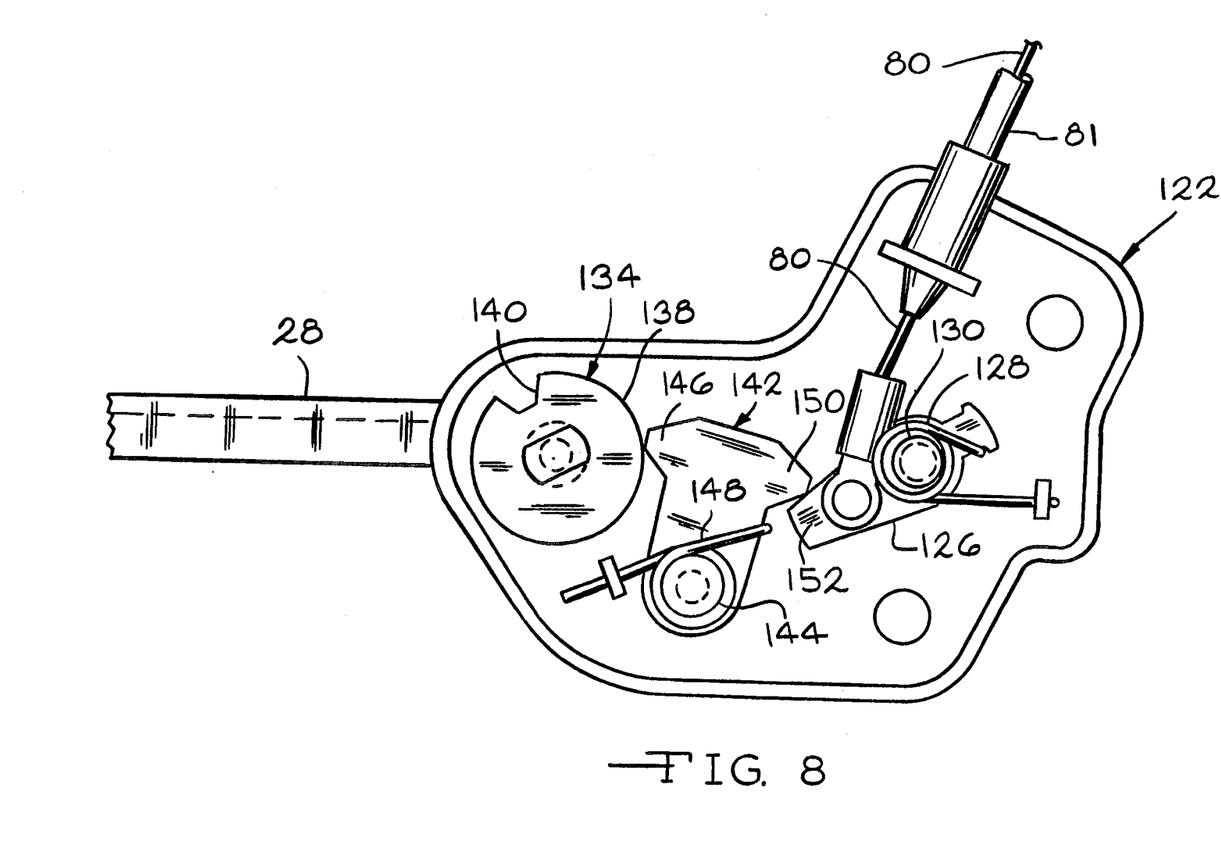
FIG. 8 is a side elevational view of the interlock mechanism of FIG. 7 with the child seat cushion panel in a deployed position.

An alternative embodiment of the interlock mechanism is shown in FIGS. 7 and 8 and designated generally at 120. Mechanism 120 includes a two piece housing 122 which is attached to the frame of the seat panel 22 by rivets or similar fasteners extending through apertures 124 in the housing 122. Cable 80 extends into the housing 122 where the cable end 104 is connected to a cam 126. Cam 126 is rotatable about a pivot 128. A coil torsion spring 130 around the pivot 128 operates to bias the cam 126 in a counterclockwise direction as viewed in FIG. 7 to the position shown in the phantom line. Tension on cable 80 from the latch 23 causes clockwise rotation of the cam 126 in opposition to the spring 130, rotating the cam clockwise to the solid line position of FIG. 7. A slot 131 in the housing defines the limits of rotation for the cam. The hardware 133 for attaching the cable to the cam projects through the slot and engages the slot ends to limit cam travel.

The child seat cushion panel 27 is mounted to a pivot shaft 132 which rotates with the panel as the panel is moved between its stowed and use positions. The pivot shaft 132 extends into the housing 122 of the interlock mechanism 120. A sector 134 is mounted to the pivot shaft and coupled to the shaft to rotate therewith by flat surfaces 136 on the pivot shaft and in the central aperture of the sector. The sector 134 has a circular periphery 138 which includes a detent notch 140.

A pawl 142 is mounted to the housing 122 for rotation about a pivot 144 which is parallel to the child seat cushion pivot shaft 132 and to the pivot 128 of the cam 126. The pawl has a generally V-shaped tooth 146 which wedges into the notch 140 in the sector 134 when the child seat cushion panel 27 is in its stowed position. A second coil torsion spring 148 about the pawl pivot 144 operates to bias the pawl in a counterclockwise direction as viewed, urging the tooth 146 into the notch 140.

The sector and pawl operate to positively retain the child seat cushion panel in its stowed position. The force of the spring 148 must be overcome when deploying the child seat. In order to deploy the child seat, the pawl 142 must be rotated, in a clockwise direction, to withdraw the tooth 146 from the sector detent notch. When the child seat is deployed, the circular periphery 130 of the sector engages the pawl tooth 146 and maintains the pawl in its clockwise rotated position with the tooth out of notch 140. In this position, the pawl tooth 150, extending in the opposite direction relative to the tooth 146, now overlies the distal end 152 of cam 126, as shown in FIG. 8. The tooth 150 is within the path of travel of the cam 126 such that the cam is not allowed to rotate in response to tension in the cable 80. This prevents release of the latch 23. Thus, when the child seat is deployed, the seat back can not be unlatched.

With reference once again to FIG. 7, when the child seat cushion panel is stowed and the latch 23 is released, the cam 126 is rotated upwardly and the distal end 152 of the cam engages the tooth 150 of the pawl. The cam prevents rotation of the pawl necessary to allow the pawl tooth 146 to withdraw from the notch in the sector. The child seat can not be deployed when the latch 23 is released.

The interlock mechanism 120 has the advantage of providing a positive retention of the child seat cushion panel in the stowed position. However, it requires the additional pawl not found in the interlock mechanism 83 shown and described in FIGS. 4, 5 and 6. Interlock mechanism 83 requires fewer components and is thus lighter and cheaper. However, interlock mechanism 83 has some inherent looseness resulting from the necessary clearance between the rotating hinge member 94 and the lock member 106 required due to the tolerances inherent in the use of cable 80. This looseness is avoided with the added pawl of mechanism 120. The pawl remains engaged with the sector. The clearance is provided between the cam and the pawl.

The interlock mechanism of the present invention provides a simple subassembly that can be added to the seat back assembly quickly and easily. The interlock mechanism avoids the need for a striker bar attached to the child seat cushion panel and also minimizes the amount of modifications required to previously existing seat back panel latches. Thus, the interlock achieves the objectives of the present invention.

While the interlock mechanism has been shown in the context of a seat back for a motor vehicle with a rear sill or package shelf, it will be clear to those skilled in the art that the interlock can be used in other seat backs such as a van bench seat having a latch for the seat back at the lower end of the seat back near the seat back pivot point. A cable connecting the seat back latch to the interlock mechanism at the child seat cushion panel pivot will function to operate the interlock mechanism.

It is to be understood that the invention is not limited to the exact construction illustrated and described above, but that various changes and modifications may be made without departing from the spirit and scope of the invention as defined in the following claims.

We claim:

1. A seat back for a motor vehicle having a body with a stationary structure, said seat back comprising:

a back panel having a frame, said back panel being movable within said body between a generally upright use position and a stowed position;

latch means mounted to said frame and the vehicle stationary structure for attaching said back panel to the stationary structure to hold said back panel in said use position, when said back panel is in said use position said latch means normally being in a latched condition in which said back panel is attached to the stationary structure and said latch means having a latch member carried by said frame which is selectively movable between a latch position corresponding to the latched condition of said latch means and a release position corresponding to a release condition of said latch means in which said back panel is released from the stationary structure and is free to be moved from said use position;

a child seat cushion panel mounted to said back panel frame for rotation relative to said back panel about a transverse axis between a stowed position within said back panel and a generally horizontal use position extending forward from said back panel in which said child seat cushion panel forms a surface upon which a child can be seated;

a rotating member coupled to said child seat cushion panel for rotation about said transverse axis together with said child seat cushion panel as said child seat cushion panel is moved between said stowed and use positions, said rotating member having an engagement portion radially extending from said axis which moves along a first path of travel as said child seat cushion panel is moved from said stowed position to said use position;

a lock member mounted to said frame adjacent to said rotating member and movable along a second path of travel between a free position and a lock position; and an elongated connector having first and second ends, said first end being coupled to said movable latch member for pulling on said connector in a first direction as said latch member is moved to said release position and said second end of said connector being attached to said lock member for moving said lock member from said free position to said lock position upon pulling of said connector in said first direction by said latch member;

said lock member having an engagement portion which is disposed within said first path of travel when said lock member is in said lock position whereby said lock member interferes with the rotation of rotating member preventing said child seat cushion panel from rotating to said use position, and said engaging portion of said rotating member being disposed in said second path of travel when said rotating member is in said use position whereby said rotating member interferes with movement of said lock member preventing said lock member from moving to said lock position.

2. The seat assembly of claim 1 further comprising:

a housing having a hollow interior mounted to said frame with said lock member and said rotating member being mounted to said housing within said interior with said second end of said connector passing into said housing for attachment to said lock member whereby said lock member and said rotating member can be assembled into said housing forming a subassembly which is mounted to said frame by an attachment of said housing to said frame.

3. The seat assembly of claim 2 wherein a portion of said rotating member extends from said housing and said child seat cushion panel is mounted to said extending portion of said rotating member whereby said child seat cushion panel is mounted to said frame.

4. The seat assembly of claim 1 wherein said connector is a pull cable.

5. The seat assembly of claim 1 further comprising bias means acting on said lock member to urge said lock member to said free position thereby pulling on said connector in a second direction opposite said first direction to urge said latch member to said latch position.

6. The seat assembly of claim 1 wherein said engagement portion of said rotating member is generally circular with a cut out portion forming a peripheral edge surface having a first section which is arcuate and concentric about said axis and an adjacent second section which is recessed inward toward said axis relative to said first arcuate section; and said engagement portion of said lock member being disposed adjacent said second section of said edge surface when said lock member is in said lock position whereby said second section of said edge surface engages said lock member upon movement of said child seat cushion panel from said stowed position.

7. The seat assembly of claim 6 wherein said lock member is generally triangular having three corners, a pivotal attachment of said lock member to said frame at a first corner, an attachment of said connector to said lock member at a second corner and a third corner forming said engagement portion, said engagement portion moving into said cut out portion of said rotating member adjacent said second section of said edge surface when said lock member is moved into said lock position whereby upon movement of said child seat cushion panel from said stowed position said second section of said edge surface engages said lock member.

8. The seat assembly of claim 7 wherein said lock member has a concave arcuate edge surface between said second and third corners which is generally concentric about said axis when said lock member is in said free position, said concave arcuate edge surface further being spaced from said rotating member engagement portion whereby said child seat cushion panel is free to rotate from said stowed position with said engagement portion of said rotating member moving into said second path of travel in confrontation with said lock member to prevent rotation of said lock member to said lock position.

9. A seat back for a motor vehicle having a body with a stationary structure, said seat back comprising:

a back panel having a frame, said back panel being movable within said body between a generally upright use position and a stowed position;

latch means mounted to said frame and the vehicle stationary structure for attaching said back panel to the stationary structure to hold said back panel in said use position, when said back panel is in said use position said latch means normally being in a latched condition in which said back panel is attached to the stationary structure and said latch means having a latch member carried by said frame which is selectively movable between a latch position corresponding to the latched condition of said latch means and a release position corresponding to a release condition of said latch means in which said back panel is released from the stationary structure and is free to be moved from said use position;

a child seat cushion panel mounted to said back panel frame for rotation relative to said back panel about a transverse axis between a stowed position within said back panel and a generally horizontal use position extending forward from said back panel in which said child seat cushion panel forms a surface upon which a child can be seated;

a sector rotatable along with said child seat cushion panel, said sector having an arcuate edge surface concentric about said axis and said sector having a detent notch extending radially inwardly from said arcuate edge surface;

a pawl mounted to said frame for rotation about a pawl axis, said pawl having two teeth radially spaced from said pawl axis and extending in opposite circumferential directions relative to said pawl axis and means for rotationally biasing said pawl to dispose one of said teeth in said detent notch in said sector when said child seat cushion panel is in said stowed position, said notch and said one tooth being configured so as to force said one tooth out of said notch by overcoming said biasing means by application of a predetermined force on said child seat cushion panel to rotate said child seat cushion panel from said stowed position;

a lock member mounted to said frame adjacent to said pawl for rotation about a third axis between a free position and a lock position; and an elongated connector having first and second ends, said first end being coupled to said movable latch member for pulling on said connector in a first direction as said latch member is moved to said release position, said second end of said connector being attached to said lock member for rotating said lock member from said free position to said lock position upon pulling of said connector in said first direction by said latch member;

said lock member confronting the other tooth of said pawl to prevent rotation of said pawl when said lock member is in said lock position whereby said pawl can not be rotated when said latch means is in said released condition and said child seat cushion panel can not be rotated from said stowed position, said other pawl tooth confronting said lock member when said lock member is in said free position and said pawl has been rotated to remove said one tooth from said detent notch upon movement of said child seat cushion panel to said use position whereby said lock member can not be rotated to said lock position and said latch means can not be released.

10. The seat of claim 9 further comprising:

a housing having a hollow interior mounted to said frame with said lock member, said pawl and said sector being mounted to said housing within said interior with said second end of said connector passing into said housing for attachment to said lock member whereby said lock member, said pawl and said sector can be assembled into said housing forming a subassembly which is mounted to said frame by an attachment of said housing to said frame.

11. A seat back for a motor vehicle having a body with a stationary structure, said seat back comprising:

a back panel having a frame, said back panel being movable within said body between a generally upright use position and a stowed position;

latch means mounted to said frame and the vehicle stationary structure for attaching said back panel to the stationary structure to hold said back panel in said use position, when said back panel is in said use position said latch means normally being in a latched condition in which said back panel is attached to the stationary structure and said latch means having a latch member carried by said frame which is selectively movable between a latch position corresponding to the latched condition of said latch means and a release position corresponding to a release condition of said latch means in which said back panel is released from the stationary structure and is free to be moved from said use position;

a housing mounted to said frame;

a child seat cushion panel having a hinge member, said hinge member being mounted to said housing for rotation about a transverse axis between a stowed position within said back panel and a generally horizontal use position extending forward from said back panel in which said child seat cushion panel forms a surface upon which a child can be seated, said hinge member having an engagement portion radially extending from said axis which moves along a first path of travel as said child seat cushion panel is moved from said stowed position to said use position;

a pull cable having two ends, one of said ends being coupled to said movable latch member for pulling said cable in a first direction as said latch member is moved to said release position, the other end of said cable extending to said housing;

lock out means carried by said housing including a lock member movable along a second path of travel between a free position and a lock position, said lock member being coupled to the other end of said cable and moved to said lock position in response to pulling of said cable in said first direction upon release of said latch, said lock member having an engagement portion which is disposed within said first path of travel when said lock member is in said lock position whereby said lock member interferes with the rotation of hinge member preventing said child seat cushion panel from moving to said use position, and said engagement portion of said hinge member being disposed within said second path of travel when said child seat cushion panel is in said use position whereby said hinge member interferes with the movement of said lock member preventing said lock member from moving to said lock position which in turn prevents said latch member from moving to said release position to place said latch means in said release condition.

12. The seat assembly of claim 11 further comprising bias means acting on said lock member to urge said lock member to said free position thereby pulling on said cable in a second direction opposite said first direction to urge said latch member to said latch position.

13. The seat assembly of claim 11 wherein said radially extending engagement portion of said hinge member is generally circular with a cut out portion forming a peripheral edge surface having a first section which is arcuate and concentric about said axis and an adjacent second section which is recessed inward toward said axis relative to said first arcuate section; and said engagement portion of said lock member being disposed adjacent said second section of said edge surface within said cut out portion of said hinge member when said lock member is in said lock position whereby said recessed second edge section engages said lock member upon movement of said child seat cushion panel from said stowed position.

14. The seat assembly of claim 13 wherein said lock member is generally triangular having three corners, a pivotal attachment of said lock member to said housing at a first corner, an attachment of said cable to said lock member at a second corner and a third corner forming said engagement portion, said engagement portion moving into said cut out portion of said hinge member adjacent said second edge section when said lock member is moved into said lock position whereby upon movement of said child seat cushion panel from said stowed position said second section of said edge surface engages said lock member.

15. The seat assembly of claim 14 wherein said lock member has a concave arcuate edge surface between said second and third corners which is generally concentric about said axis when said lock member is in said free position and is spaced from said hinge member engagement portion whereby said child seat cushion panel is free to rotate from said stowed position with said hinge member engagement portion moving into confrontation with said lock member in said second path of travel to prevent rotation of said lock member to said lock position.

16. The seat assembly of claim 11 wherein said housing has a hollow interior and said lock member and said engagement portion of said hinge member are disposed in said housing interior and said cable passes into said housing interior where said other end of said cable is attached to said lock member.

* * * * *